(12) United States Patent
Rentfrow

(10) Patent No.: US 10,975,944 B2
(45) Date of Patent: Apr. 13, 2021

(54) HYBRID MODULE WITH IMPACT TORQUE LIMITER

(71) Applicant: Schaeffler Technologies AG & Co. KG, Herzogenaurach (DE)

(72) Inventor: Peter Rentfrow, Doylestown, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/568,456

(22) Filed: Sep. 12, 2019

(65) Prior Publication Data

US 2021/0079988 A1 Mar. 18, 2021

(51) Int. Cl.
*F16H 45/02* (2006.01)
*F16F 15/129* (2006.01)

(52) U.S. Cl.
CPC ......... *F16H 45/02* (2013.01); *F16F 15/1297* (2013.01); *F16H 2045/0226* (2013.01)

(58) Field of Classification Search
CPC .............. F16H 45/02; F16H 2045/0226; F16F 15/1297
See application file for complete search history.

(56) References Cited

U.S. PATENT DOCUMENTS

| 7,238,111 B2 | 7/2007 | Kintou et al. |
| 9,917,482 B2 | 3/2018 | Lindemann et al. |
| 10,648,531 B2* | 5/2020 | Maienschein ............ B60K 6/40 |
| 2013/0310216 A1* | 11/2013 | Kamiya .................. B60L 50/16 |
| | | 477/5 |

* cited by examiner

*Primary Examiner* — Huan Le
(74) *Attorney, Agent, or Firm* — Kevin L. Parks

(57) ABSTRACT

A hybrid module includes a rotor carrier, a rotor, first and second pluralities of clutch plates, an input, a spring element, and first and second torsion dampers. The rotor carrier has a first outer circumferential surface and an inner circumferential surface with a first spline. The rotor is fixed to the first outer circumferential surface. The first plurality of clutch plates is drivingly connected to the first spline. The input has a second outer circumferential surface with a second spline. The second plurality of clutch plates is drivingly connected to the second spline. The spring element is for compressing the clutch plates to transmit a clutch torque. The first torsion damper is arranged in a first torque path between the input and an engine. The second torsion damper is arranged in a second torque path between the rotor carrier and a multi-speed transmission.

16 Claims, 1 Drawing Sheet

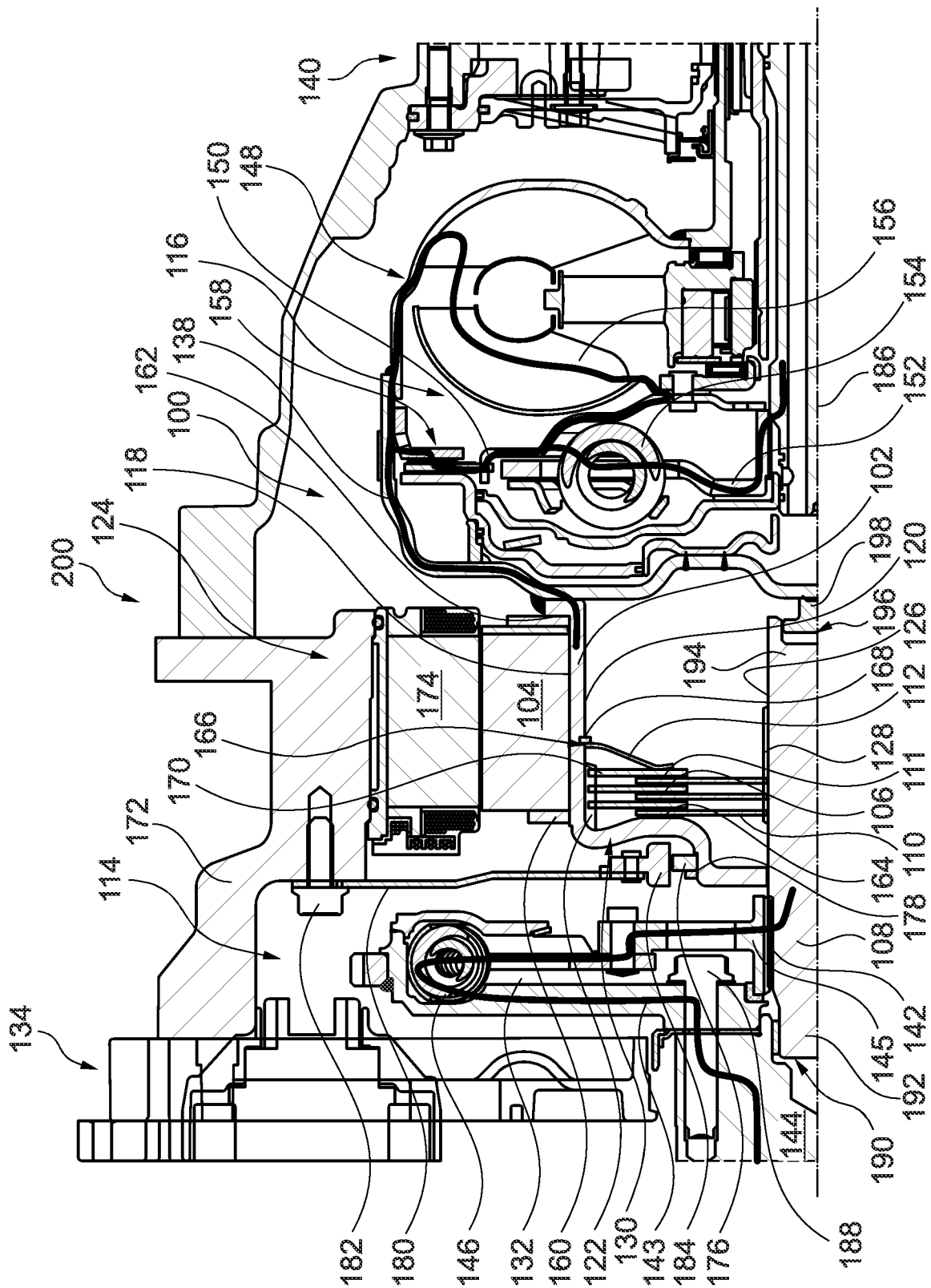

HYBRID MODULE WITH IMPACT TORQUE LIMITER

TECHNICAL FIELD

The present disclosure relates generally to a torque limiter, and more specifically to a hybrid module with an impact torque limiter.

BACKGROUND

Hybrid modules are known. One example is shown in commonly-assigned U.S. Pat. No. 9,917,482 titled HYBRID DRIVE MODULE HAVING A ROTOR SECURED TO A HUB VIA STAKING, hereby incorporated by reference as if set forth fully herein.

SUMMARY

Example embodiments broadly comprise a hybrid module including a rotor carrier, a rotor, first and second pluralities of clutch plates, an input, a spring element, and first and second torsion dampers. The rotor carrier has a first outer circumferential surface and an inner circumferential surface with a first spline. The rotor is for an electric motor and fixed to the first outer circumferential surface. The first plurality of clutch plates is drivingly connected to the first spline. The input has a second outer circumferential surface with a second spline. The second plurality of clutch plates is interposed with the first plurality of clutch plates and drivingly connected to the second spline. The spring element is for compressing the first plurality of clutch plates together with the second plurality of clutch plates to transmit a clutch torque. The first torsion damper is arranged in a first torque path between an engine and the input. The second torsion damper is arranged in a second torque path between the rotor carrier and a multi-speed transmission.

In an example embodiment, the input has a third spline, and the first torsion damper has a damper input for fixing to a crankshaft of the engine, a damper output, partially rotatable relative to the damper input and drivingly engaged with the third spline, and a plurality of compression springs arranged circumferentially between the damper input and the damper output. In some example embodiments, the hybrid module has a torque converter fixed to the rotor carrier. In an example embodiment, the torque converter includes the second torsion damper. In some example embodiments, the hybrid module has a first end plate fixed to the rotor carrier. The rotor carrier has a first radial wall and the rotor is fixed between the first end plate and the first radial wall. In an example embodiment, the first end plate is fixed by staking the rotor carrier.

In some example embodiments, the rotor carrier has a second radial wall and the spring element is arranged to compress the first plurality of clutch plates and the second plurality of clutch plates against the second radial wall. In an example embodiment, the hybrid module includes a snap ring. The rotor carrier has an inner groove, the snap ring is disposed in the inner groove, and the spring element is compressed between a second end plate of the first plurality of clutch plates and the snap ring. In some example embodiments, the hybrid module includes a housing arranged for installation in a vehicle drivetrain between the engine and a multi-speed transmission. In an example embodiment, the hybrid module has a stator for an electric motor fixed to the housing.

In some example embodiments, the hybrid module has a resolver rotor. The rotor carrier has a third outer circumferential surface and the resolver rotor is installed on the third outer circumferential surface. In some example embodiments, the hybrid module has a housing, a third end plate fixed to the housing, and a resolver stator fixed to the third end plate. In an example embodiment, the resolver rotor and the resolver stator are at least partially axially aligned with the first plurality of clutch plates or the second plurality of clutch plates.

Other example aspects broadly comprise a hybrid drivetrain including the hybrid module and the engine including a maximum engine torque. The clutch torque is greater than the maximum engine torque. In an example embodiment, the hybrid drivetrain includes the electric motor with a maximum electric motor torque. The clutch torque is greater than a sum of the maximum engine torque and the maximum electric motor torque. In an example embodiment, the engine includes a crankshaft, and the first torsion damper is fixed to the crankshaft by bolts. In an example embodiment, the hybrid drivetrain includes a torque converter fixed to the rotor carrier. The engine includes a crankshaft with a first bore and the input is a shaft with a first axial end installed in the first bore. The shaft has a second axial end, opposite the first axial end, with a second bore, and the torque converter includes a pilot installed in the second bore.

BRIEF DESCRIPTION OF THE DRAWINGS

The single FIGURE illustrates a top half section view of a portion of a hybrid drivetrain according to an example embodiment.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

The following description is made with reference to the FIGURE. The single FIGURE illustrates a top half section view of a portion of a hybrid drivetrain according to an example embodiment. Hybrid module 100 includes rotor carrier 102, rotor 104, clutch plates 106, input 108, clutch plates 110, spring element 112, and torsion dampers 114 and 116. The rotor carrier includes outer circumferential surface 118 and inner circumferential surface 120 with spline 122. The rotor is for electric motor 124 as discussed in more detail below. The rotor is fixed to outer circumferential surface 118 by a keyway, press-fit, adhesive, etc. as is known in the art.

Clutch plates 106 are drivingly connected to spline 122. That is, clutch plates 106 include complementary features that engages spline 122 such that rotor carrier 102 and clutch plates 106 are rotationally fixed for cojoint rotation. Input 108 includes outer circumferential surface 126 with spline 128. Clutch plates 110 are interposed with clutch plates 106 and drivingly connected to spline 128 in a manner similar to clutch plates 106 and spline 122 described above. Spring element 112 is for compressing clutch plates 106 together with clutch plates 110 to transmit a clutch torque as described in more detail below. In the embodiment shown, clutch plates 110 are shown with friction material rings 111 affixed thereto, but other embodiments may have clutch plates 106 with friction material rings or both clutch plates 106 and clutch plates 110 with friction material rings. Clutch plates 106, 110, and spring element 112 form impact torque limiter 130 that can slip to protect drivetrain components during impact events.

Torsion damper 114 is arranged in torque path 132 between engine 134 and the input. Torsion damper 116 is arranged in torque path 138 between the rotor carrier and multi-speed transmission 140. Input 108 includes spline 142. Torsion damper 114 includes damper input 143 for fixing to crankshaft 144 of engine 134 and damper output 145, partially rotatable relative to the damper input and drivingly engaged with spline 142. Torsion damper 114 also includes compression springs 146 arranged circumferentially between the damper input and the damper output. That is, in the embodiment shown in the FIGURE, the damper input and the damper output comprise respective faces (not shown) contacting compression springs 146 such that, when the damper input is rotated relative to the damper output, or vice versa, the compression springs are compressed.

Torsion damper 114 is designed to improve drivetrain NVH (noise, vibration, harshness) during normal driving conditions. But torsion damper 114 also adds a degree of freedom to the hybrid drivetrain and, in conjunction with torsion damper 116, increases a likelihood of impacts during certain operating conditions (e.g., engine startup, fast clutch engagements, wheel slipping on ice and suddenly getting traction). Impact torque limiter 130 is designed to slip during impact events to protect the drivetrain. Hybrid module 100 includes torque converter 148 fixed to rotor carrier 102. Torque converter 148 includes torsion damper 116.

As can be seen from the FIGURE, damper 116 is active (that is, input 150 is rotated relative to output 152 to compress springs 154) when torque is transmitted to the damper from turbine 156 or lockup clutch 158, such that damper 116 is configured as a turbine damper as is known in the art. It should be noted, however, that damper 116 may be another style of damper.

For example, damper 116 may be a conventional damper (not shown) where the damper is only active when torque is transmitted by the lockup clutch and inactive when torque is transmitted by the turbine, or a double-damper (not shown) where different springs are compressed depending on whether torque is introduced to the damper from the turbine or from the lockup clutch.

Hybrid module 100 includes end plate 160 fixed to the rotor carrier. Rotor carrier 102 includes radial wall 162 and rotor 104 is fixed between end plate 160 and radial wall 162. End plate 160 is fixed by staking the rotor carrier. For example, end plate 160 may be pressed onto rotor carrier 102 to hold the rotor tight against radial wall 162, and a tool (not shown) may be used to deform material from the rotor carrier preventing loosening of the end plate.

Rotor carrier 102 includes radial wall 164. Spring element 112 is arranged to compress clutch plates 106 and clutch plates 110 against radial wall 164. Rotor carrier 102 includes inner groove 166 and the hybrid module includes snap ring 168 disposed in the inner groove. Spring element 112 is compressed between end plate 170 of clutch plates 106 and the snap ring. Although inner groove is shown on rotor carrier 102, other example embodiments may include the groove as an outer groove on input 108 and spring element 112 compressed between a snap ring installed in the outer groove and an end plate (not shown) of clutch plates 110. Torque transmitted by impact torque limiter 130 before slipping can be adjusted by changing a number of clutch plates 106 and/or clutch plates 110, changing a spring rate or amount of compression of spring 112 (axial location of inner groove 166), and/or selecting a particular material for friction material rings 111 to obtain a desired friction coefficient, for example.

Hybrid module 100 includes housing 172 arranged for installation in a vehicle drivetrain between engine 134 and multi-speed transmission 140. Hybrid module 100 includes stator 174 for electric motor 124 fixed to the housing. Rotor 104 and stator 174 each form a portion of electric motor 124. The stator may be connected to a power source (e.g., a battery) via power cables (not shown) and controlled by an inverter (not shown), for example, to rotate the rotor. Hybrid module 100 includes resolver rotor 176. Rotor carrier 102 includes outer circumferential surface 178 and the resolver rotor is installed on outer circumferential surface 178. The resolver rotor may be pressed onto surface 178, for example.

Hybrid module 100 includes end plate 180 is fixed to housing 172 by bolts 182, for example, and resolver stator 184 is fixed to end plate 180. As can be seen in the FIGURE, the resolver rotor and the resolver stator are at least partially axially aligned with clutch plates 106 and 108. In this contact, axially aligned means a first straight line drawn parallel to axis 186 can pass through a portion of the resolver rotor and the clutch plates, and a second straight line drawn parallel to axis 186 can pass through a portion of resolver stator and the clutch plates.

Hybrid drivetrain 200 includes hybrid module 100 and engine 134. The engine includes crankshaft 144 and a maximum engine torque. In this context, maximum engine torque is calculated as the maximum net or brake engine torque available at the crankshaft plus any torque fluctuation passed through to the rotor carrier. The clutch torque transmitted by clutch plates 106 and 110 discussed above is greater than the maximum engine torque. That is, a number of clutch plates 106 and/or clutch plates 110, the spring rate of compression spring 112, and/or the material of friction material rings 111 is selected such that the torque transmitted by impact torque limiter 130 is greater than the maximum engine torque. Hybrid drivetrain 200 includes electric motor 124 with a maximum electric motor torque, and the clutch torque is greater than a sum of the maximum engine torque and the maximum electric motor torque.

Engine 134 includes crankshaft 144. Torsion damper 114 is fixed to the crankshaft by bolts 188. Crankshaft 144 includes bore 190. Input 108 is a shaft with axial end 192 installed in bore 190 and axial end 194, opposite axial end 192, with bore 196. Torque converter 148 includes pilot 198 installed in bore 196.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS

100 Hybrid module
102 Rotor carrier
104 Rotor
106 Clutch plates (first plurality)
108 Input
110 Clutch plates (second plurality)
111 Friction material rings
112 Spring element
114 Torsion damper (first)
116 Torsion damper (second)
118 Outer circumferential surface (first)
120 Inner circumferential surface (first)
122 Spline (first)
124 Electric motor
126 Outer circumferential surface (second)
128 Spline (second)
130 Impact torque limiter
132 Torque path (first)
134 Engine
138 Torque path (second)
140 Multi-speed transmission
142 Spline (third)
143 Damper input (first)
144 Crankshaft
145 Damper output (first)
146 Compression springs
148 Torque converter
150 Input (second damper)
152 Output (second damper)
154 Springs (second damper)
156 Turbine
158 Lockup clutch
160 End plate (first)
162 Radial wall (second)
164 Radial wall (first)
166 Inner groove
168 Snap ring
170 End plate (second)
172 Housing
174 Stator
176 Resolver rotor
178 Outer circumferential surface (third)
180 End plate (third)
182 Bolts (end plate)
184 Resolver stator
186 Axis
188 Bolts (crankshaft)
190 Bore (first, crankshaft)
192 Axial end (first, input)
194 Axial end (second, input)
196 Bore (second, input)
198 Pilot (torque converter)
200 Hybrid drivetrain

What is claimed is:

1. A hybrid module, comprising:
a rotor carrier comprising:
a first radial wall;
a first outer circumferential surface; and
an inner circumferential surface with a first spline;
a rotor for an electric motor fixed to the first outer circumferential surface;
a first plurality of clutch plates drivingly connected to the first spline;
an input comprising a second outer circumferential surface with a second spline;
a second plurality of clutch plates interposed with the first plurality of clutch plates and drivingly connected to the second spline;
a spring element for compressing the first plurality of clutch plates and the second plurality of clutch plates against the first radial wall to transmit a clutch torque;
a first torsion damper arranged in a first torque path between an engine and the input; and
a second torsion damper arranged in a second torque path between the rotor carrier and a multi-speed transmission.

2. The hybrid module of claim 1 wherein:
the input comprises a third spline; and
the first torsion damper comprises:
a damper input for fixing to a crankshaft of the engine;
a damper output, partially rotatable relative to the damper input and drivingly engaged with the third spline; and
a plurality of compression springs arranged circumferentially between the damper input and the damper output.

3. The hybrid module of claim 1 further comprising a torque converter fixed to the rotor carrier.

4. The hybrid module of claim 3 wherein the torque converter comprises the second torsion damper.

5. The hybrid module of claim 1 further comprising a first end plate fixed to the rotor carrier, wherein the rotor carrier comprises a first second radial wall and the rotor is fixed between the first end plate and the first second radial wall.

6. The hybrid module of claim 5 wherein the first end plate is fixed by staking the rotor carrier.

7. The hybrid module of claim 1 further comprising a snap ring, wherein:
the rotor carrier comprises an inner groove;
the snap ring is disposed in the inner groove; and the spring element is compressed between a second end plate of the first plurality of clutch plates and the snap ring.

8. The hybrid module of claim 1 further comprising a housing arranged for installation in a vehicle drivetrain between the engine and the multi-speed transmission.

9. The hybrid module of claim 8 further comprising a stator for the electric motor fixed to the housing.

10. The hybrid module of claim 1 further comprising a resolver rotor, wherein the rotor carrier comprises a third outer circumferential surface and the resolver rotor is installed on the third outer circumferential surface.

11. The A hybrid module further comprising:
a rotor carrier comprising:
   a first outer circumferential surface;
   a third outer circumferential surface; and
   an inner circumferential surface with a first spline;
a rotor for an electric motor fixed to the first outer circumferential surface;
a first plurality of clutch plates drivingly connected to the first spline;
an input comprising a second outer circumferential surface with a second spline;
a second plurality of clutch plates interposed with the first plurality of clutch plates and drivingly connected to the second spline;
a spring element for compressing the first plurality of clutch plates together with the second plurality of clutch plates to transmit a clutch torque;
a first torsion damper arranged in a first torque path between an engine and the input;
a second torsion damper arranged in a second torque path between the rotor carrier and a multi-speed transmission;
a resolver rotor installed on the third outer circumferential surface;
a housing;
a third end plate fixed to the housing; and
a resolver stator fixed to the third end plate.

12. The hybrid module of claim 11 wherein the resolver rotor and the resolver stator are at least partially axially aligned with the first plurality of clutch plates or the second plurality of clutch plates.

13. A hybrid drivetrain comprising:
an engine comprising a maximum engine torque; and
a hybrid module, comprising:
   a rotor carrier comprising a first outer circumferential surface and an inner circumferential surface with a first spline;
   a rotor for an electric motor fixed to the first outer circumferential surface;
   a first plurality of clutch plates drivingly connected to the first spline;
   an input comprising a second outer circumferential surface with a second spline;
   a second plurality of clutch plates interposed with the first plurality of clutch plates and drivingly connected to the second spline;
   a spring element for compressing the first plurality of clutch plates together with the second plurality of clutch plates to transmit a clutch torque greater than the maximum engine torque;
   a first torsion damper arranged in a first torque path between the engine and the input; and
   a second torsion damper arranged in a second torque path between the rotor carrier and a multi-speed transmission.

14. The hybrid drivetrain of claim 13 further comprising the electric motor comprising a maximum electric motor torque and the clutch torque is greater than a sum of the maximum engine torque and the maximum electric motor torque.

15. The hybrid drivetrain of claim 13 wherein:
the engine comprises a crankshaft, and
the first torsion damper is fixed to the crankshaft by bolts.

16. The hybrid drivetrain of claim 13 further comprising a torque converter fixed to the rotor carrier, wherein:
the engine comprises a crankshaft;
the crankshaft comprises a first bore;
the input is a shaft comprising a first axial end installed in the first bore and a second axial end, opposite the first axial end, comprising a second bore; and
the torque converter comprises a pilot installed in the second bore.

* * * * *